United States Patent [19]
Sinclair et al.

[11] Patent Number: 5,273,785
[45] Date of Patent: Dec. 28, 1993

[54] METHODS AND COMPOSITIONS FOR BONDING PROPELLANTS WITHIN ROCKET MOTORS

[75] Inventors: James W. Sinclair, Logan; David Lefgren, Garland, both of Utah; Kyung J. Min, Daejun, Rep. of Korea

[73] Assignee: Thiokol Corporation, Ogden, Utah

[21] Appl. No.: 746,642

[22] Filed: Aug. 15, 1991

[51] Int. Cl.⁵ .............................................. B05D 3/00
[52] U.S. Cl. ............................ 427/299; 102/290; 149/19.4; 149/19.9; 264/3.1; 427/340
[58] Field of Search .............. 102/290; 149/19.4, 19.9; 264/3.1; 427/299, 340

[56] References Cited

U.S. PATENT DOCUMENTS

| | | | |
|---|---|---|---|
| 3,087,844 | 4/1963 | Hudson et al. | 149/19.9 |
| 3,147,161 | 9/1964 | Aberc et al. | 149/19 |
| 3,730,792 | 5/1973 | Frost et al. | 149/19 |
| 3,745,074 | 7/1973 | Allen | 149/7 |
| 3,759,764 | 9/1973 | Short | 149/19 |
| 3,762,972 | 10/1973 | Allen | 149/109 |
| 3,779,824 | 12/1973 | Mahan | 149/19.9 |
| 3,791,888 | 2/1974 | Hudson | 149/19 |
| 3,932,353 | 1/1976 | Mastrolia et al. | 260/45.75 |
| 3,960,088 | 6/1976 | Greever | 102/103 |
| 3,977,923 | 8/1976 | Uelzmann | 149/19.1 |
| 4,090,893 | 5/1978 | Cucksee et al. | 149/19.9 |
| 4,427,468 | 1/1984 | Duchesne et al. | 149/19.9 |
| 4,429,634 | 2/1984 | Byrd et al. | 102/290 |
| 4,482,406 | 11/1984 | Stephens | 149/19.4 |
| 4,601,862 | 7/1986 | Byrd et al. | 264/3.1 |
| 4,803,019 | 2/1989 | Graham et al. | 102/290 X |
| 4,925,504 | 5/1990 | Sayles | 149/21 |
| 5,031,539 | 7/1991 | Hutchens | 264/3.1 X |

*Primary Examiner*—Michael Lusigan
*Attorney, Agent, or Firm*—Madson & Metcalf

[57] ABSTRACT

A system and composition is disclosed for binding rocket motor propellants directly to the insulation layer within the rocket motor. Conventionally, it is necessary to place a liner layer between the insulation and the propellant. The present invention is particularly adaptable for use with hydroxy-terminated polybutadiene-type (HTPB) propellants. The method of the invention involves coating the insulation layer with a reactive material, such as a solution of isophorone diisocyanate (IPDI). The reactive material is then allowed to penetrate the insulation layer. Once sufficient penetration is achieved, the HTPB-based propellant is applied over the insulation layer to form a rocket motor propellant grain. The IPDI reacts with both the insulation layer and the propellant and forms a strong bond between the two. In the case of the propellant, additional urethane linkages are generally formed, which results in an area near the bond which may be harder than the propellant grain as a whole. In certain instances it is desirable to add further materials to the reactive material, such as di- and tri-functional aziridines.

22 Claims, 4 Drawing Sheets

METHODS AND COMPOSITIONS FOR BONDING PROPELLANTS WITHIN ROCKET MOTORS

BACKGROUND

The Field of the Invention

The present invention is related to systems and compositions adaptable for binding rocket motor propellants directly to the insulation layer within the rocket motor. More particularly, the present invention is related to the binding of hydroxy-terminated polybutadiene-type (HTPB) propellants to insulation layers by the use of a reactive intermediate material, such as isophorone diisocyanate (IPDI), which material reacts with both the HTPB propellant and the insulation layer.

Technical Background

Rocket motors are presently employed in a number of different contexts. Rocket motors are used to propel payloads of various types at high speeds over a specified distance. While rockets have been commonly used in military applications, modern technological development have provided a number of other uses for rocket motors.

Rocket motors are used in space exploration. Space exploration presently includes the space shuttle, as well as a number of unmanned space craft. Rocket motors are also now used for commercial purposes. Governments, and even private companies, have employed rocket motors for propelling satellites into orbit. These satellites facilitate communications of various types. For example, radio and television signals can be relayed by satellite. Satellites are also used for observation of weather and environmental conditions on the earth's surface.

To a large extent, many different rocket motors are comprised of the same general types of elements. This is often true somewhat regardless of the expected use,, or even the size, of the rocket motor.

The standard elements which comprise rocket motors include the casing or outside housing of the rocket motor. Placed within the casing is a layer of insulation which serves to insulate the casing from the interior of the rocket motor. In the conventional rocket motor, a liner is placed within the insulation layer. The liner is bonded to the insulation layer on one surface. The opposite surface of the liner is typically bonded to the propellant grain. The propellant grain comprises the propellant or fuel of the rocket motor. The propellant is comprised of a composition which produces a sufficiently high level of energy when ignited that the rocket motor is propelled in the desired manner.

Also placed within the rocket motor is a device for igniting the propellant grain at the desired point in time. Igniters of various designs and configurations are well known in the art.

While several types of propellants are known in the art, a number of components of propellants are widely used. For example, a typical propellant is comprised of a fuel, an oxidizer, and a binder material which binds the composition together. In some cases, the binder may also act as the fuel. One group of propellants employs a hydroxy-terminate polybutadiene (HTPB) binder. Such HTPB-based propellants have been found to be extremely desirable and have obtained wide acceptance in the art. In many systems, a curing agent, such as an isocyanate curing agent, is also included in the composition.

One of the major problems the construction and manufacture of rocket motors is related to the secure placement of the propellants within the rocket motor casing. As mentioned above, one common approach to bonding of composite propellants within the casing is by use of an elastomeric liner. The liner is placed between the insulation layer and propellant. The liner is secured to the insulation layer on one side and to the propellant on the other side. The liner is typically made from the same materials and cure system as the propellant itself. The liner is often filled with carbon or silica for strength.

A complex multiple step process is conventionally used in binding propellants to liners. Initially it is necessary to prepare the insulation layer to be bound to the liner. The liner material must then be prepared and applied to the insulation layer. Once applied, the liner is cured at elevated temperature (usually in the range of 135° F.) for a number of days. It is then necessary to prepare the liner to receive the propellant. The propellant is poured into place in the rocket motor casing over the liner and then cured. This process has been found to be complex, time consuming, and expensive and to add greatly to the difficulty of producing a reliable rocket motor.

With regard to the reliability problem, it is found that a large percentage of rocket motor failures are due to failure of the bond or attachment between the insulation layer, the liner, and the propellant. One specific problem is that the isocyanate curing agent of the propellent is known to migrate into the liner, causing a soft layer which is prone to failure. Moisture or contamination at any point in the process may also result in a weak spot in the binding of the layers. Finally, the complex procedure used in producing the final rocket motor leaves many opportunities for a less than ideal bond, and thus an increased possibility of failure of the bond.

Failure at any of the surface interfaces may result in an increased burn rate at a particular location once the propellant is ignited. This increase in the burn rate can directly result in failure of the rocket motor in that the casing in that location may not be designed to withstand the increased pressure that the increased burning surface has generated at the point of bond failure. Some of the other problems observed with the use of the liner include problems related to the introduction of an additional interface within the system, isocyanate and plasticizer diffusion, and age-induced peel value reduction in some systems.

In summary, the conventional method of casting propellant within a rocket motor casing is complex and problematic. The process involves the creation of a multi-layer structure within the casing. The creation of each layer is a difficult, time consuming, and expensive process. At the same time, each layer and each interface presents additional opportunities for failure of the system. Furthermore, the layers are not wholly compatible and components of one layer may actually lead to the degradation of an adjoining layer. For example, the migration of isocyanate curing agent from the propellant layer into the liner may cause failure of the liner. Thus, the manufacture of the rocket motor is greatly complicated by the multiple layers and multiple bonds which are required.

Accordingly, it would be an advancement in the art to provide a more simplified and more reliable method for binding propellant within a rocket motor casing, such that a more reliable and economical rocket motor could be produced. In that regard, it would be a significant advancement in the art to provide methods and compositions for placing propellant within a rocket motor casing without the need for a liner layer. It would be a related advancement in the art to provide such a structure wherein the propellant could be bound directly to the insulation layer, thereby eliminating the need for the liner layer. It would be a further advancement in the art to provide such a method and composition which was flexible to use and which could be used with a variety of insulation materials, and which was specifically design to be used with a variety of HTPB-based propellant systems.

Such methods and apparatus are disclosed and claimed herein.

BRIEF SUMMARY AND OBJECTS OF THE INVENTION

The present invention is related to compositions and methods for binding propellants to insulation layers within rocket motor casings. By the use of the method and compositions of the present invention, it is possible to directly attach the propellant to the insulation, thus eliminating the need for the liner layer. The elimination of the liner layer eliminates one of the major sources of rocket motor failure and also makes the manufacture of rocket motors much more simple and economical.

The present invention is related to the discovery that it is possible to chemically bond a rocket motor insulation layer directly to the propellant. In order to accomplish this bonding, the insulation layer is installed in the rocket motor in the conventional manner. In the typical rocket motor, the insulation material is vulcanized elastomer of the type well known in the art. Various types of ethylpropylene diene monomer (EPDM) elastomers are conventionally used as insulators in this type of rocket motor. Other insulators with similar properties may also be used within the scope of the present invention. Thermoplastic elastomer (TPE) insulation materials may also be employed. Such insulation materials are sometimes filled with Kevlar ® or silica in order to avoid erosion.

In one preferred embodiment of the present invention, once the insulation layer is in place within the rocket case, it is coated with a reactive material. The reactive material is chosen such that it is capable of reacting with both the insulation material and the propellant, forming strong chemical bonds with both materials. In one preferred system, hydroxy-terminated polybutadiene-based (HTPB) propellants are used in conjunction with isophorone diisocyanate (IPDI) as the reactive material. The insulation layer is of the usual type, typically employing a vulcanized elastomer.

The first step of the method of the present invention involves coating the insulation layer with the reactive material. Once the insulation layer is coated, the propellant is poured into the rocket motor casing such that it contacts the coated insulation layer. Since the insulation layer is coated with the reactive material, the propellant also contacts the reactive material. Since the reactive material is chosen such that it reacts with both the insulation layer and the propellant, strong chemical bonds are formed which directly bind the insulation layer and the propellant. The use of such a reactive material allows one to eliminate the liner from the final product. Furthermore, since the reactive material diffuses and reacts in the propellant and insulation, there is no separate layer of reactive material remaining in the final bond system.

As mentioned above, one embodiment of the invention teaches the use of a HTPB-based propellant. The reactive material may, for example be isophorone diisocyanate (IPDI), or a solution of IPDI. In the typical HTPB-based propellant system, the IPDI diffuses and reacts in the propellant and becomes part of the propellant urethane cross linked binder. As will be discussed in additional detail below, by controlling the process parameters it is possible to achieve a final product in which a higher concentration of urethane bonds exist at the insulation/propellant interface than in the cured propellant as a whole. This results in a harder material at the interface. That is, the propellant at and near the interface may actually be the strongest portion of the propellant grain. Thus, the final product is much less likely to fail than are conventional liner/propellant systems.

In order to achieve the desired level of bonding, and to precisely control the characteristics of the end product, it is possible to vary certain process parameters in the present invention. For example, the extent of the diffusion and reaction between the reactive material (such as IPDI) and the insulation layer can be controlled by adjusting the concentration of reactive material coated onto the insulation layer. Similarly, it is a simple matter to control or vary the time between the placement of the reactive material on the insulation layer and the addition of the propellant, in order to achieve a desired level of reaction with the insulation layer. Finally, it is possible to provide an insulation layer which has a chosen permeability to the reactive material. Thus, by adjusting these and other process parameters, a final product with specified desirable characteristics can be achieved.

It will be appreciated that a variety of reactive material formulations may be used. For specific insulation layer/propellant systems, and for specific types of rocket motors, it may be desirable to adjust the chemical properties of the reactive material in order to achieve specific bonding characteristics. For example, in one embodiment of the present invention which employs IPDI, one or more di- or tri-functional aziridines are added to the IPDI to form a solution of the components.

Two such aziridines are known by the trade names HX-752 and HX-868, and are manufactured by 3-M Company of St. Paul, Minn. The concentration of the aziridine in the IPDI can be varied over a wide range as desired. For example, concentrations of from about 1% to about 40% all have been found to produce acceptable results when used in the context of the present invention. Generally, however, in situations where the addition of an aziridine is desired, approximately 10% aziridine produces optimum results.

The aziridines bind the insulation and the propellant by a mechanism separate from the IPDI mechanism. Specifically, the aziridines diffuse and react with ammonium perchlorate and polymerizes within the propellant and the insulator to form an additional set of chemical bonds that provide reinforcing of the interface propellant.

Using the present invention it is possible to produce a much more reliable rocket motor product. Since the propellant and the installation layer are securely bonded together and the interface propellant is reinforced, the liner layer is no longer necessary. The elimination of the liner provides many benefits. Manufacturing is easier and less expensive. At the same time the rocket motor produced is much more reliable and the components of the rocket motor are much less likely to fail.

It is, therefore, an object of the present invention to provide a more simplified and reliable method for binding propellant within a rocket motor casing such that a more reliable and economical rocket motor can be produced.

It is a related object of the present invention to provide methods and compositions for placing propellant within a rocket motor casing without the need for a liner layer.

It is another object of the present invention to provide a structure wherein the propellant can be bound directly to the insulation layer, thereby eliminating the need for the liner layer.

It is a further object of the invention to provide methods and compositions for binding propellants to insulation layers which are flexible to use and which can be used with a variety of insulation materials and a variety of propellant systems, particularly HTPB-based propellant systems.

These and other objects and advantages of the invention will become apparent upon reading the following detailed description and appended claims, and upon reference to the accompanying drawings.

BRIEF DESCRIPTION OF THE DRAWINGS

In order that the manner in which the objects of the invention are obtained can be more fully understood, a more particular description of the invention will be rendered by reference to specific embodiments thereof, which embodiments are illustrated in the appended drawings. Understanding that these drawings depict only typical embodiments of the invention, and are not therefore to be considered limiting of its scope, the invention will be described and explained with additional specificity and detail through the use of the accompanying drawings in which.

DETAILED DESCRIPTION OF THE PREFERRED EMBODIMENTS

The present invention provides compositions and methods whereby the liner system typically employed in the production of rocket motors can be eliminated. Thus, it is possible to eliminate the difficult manufacturing steps of preparing the insulation layer for bonding with a liner, mixing and preparing the liner, applying the liner, allowing the liner to cure at elevated temperature (usually over a period of days), and then casting and curing the propellant in such a manner that it binds to the liner. The present invention greatly simplifies motor production and the necessary bond chemistry involved. Even though the present invention is capable of entirely eliminating the liner, it is still possible to retain the positive aspects of the liner bond, including good bond strength and reliability.

In certain preferred embodiments of the present invention, methods and compositions for bonding an HTPB-based propellant directly to an insulation layer are disclosed. The system provides an "interpenetrating bonding system" (IBS) such that the propellant and the insulation layer are bonded directly to one another. Essentially, the system provides a reactive material which diffuses into both the insulation and the propellant, and reacts with both materials. The bond system created by this mechanism extends across the propellant/insulation interface into both the adherends.

The method of the present invention teaches a relatively simply, quick, and inexpensive process for bonding the propellant grain within the rocket motor casing. Using the present invention, the insulation layer is inserted into the motor casing by conventional methods. Then a reactive material, or interpenetrating bond system, is applied to the surface of the insulation layer. The level of reactive material applied is controlled and is applied at a predetermined concentration. For purposes of this disclosure, the level of reactive material is expressed in grams/foot$^2$. Following application of the reactive material, the coated insulation is generally held at ambient conditions for a period of time (hereinafter sometimes referred to as "$t_1$"). The time period is usually a few days and usually in the range of from about 1 day to about 70 days. The propellant is then cast into the rocket motor over the insulation layer. Finally, the system is cured as required by the propellant type.

In certain preferred embodiments of the invention, the reactive material is isophorone diisocyanate (IPDI). IPDI is known to react with HTPB-based propellants, as well as with conventional insulation materials such as thermoplastic elastomers (TPE) and EPDM.

In some instances it has also been found beneficial to add further reactive species in solution with the IPDI. Such species may include, for example, di- and tri- functional aziridines. Some such aziridines include 1,3 bis benzoyl 2 methyl aziridine, known by the commercial name of HX-752, and 1,3,5 tris benzoyl 2 ethyl aziridine, known by the commercial name of HX-868.

Figure 1:
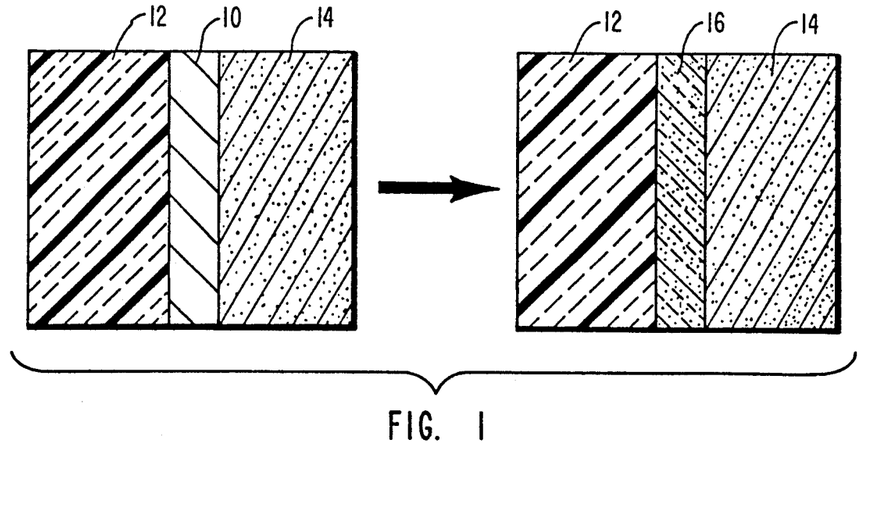
FIG. 1 is a block diagram illustrating the method of the present invention, including the application of the reactive material and the final bonded product.

The concept of the invention is illustrated in FIG. 1. The box at the left of FIG. 1 graphically illustrates the reactive material, or interpenetrating bonding system (IBS) 10, placed at the interface between the insulation layer 12 and the propellant 14. In the illustrated embodiment, the IPDI diffuses into both the propellant and the insulation layer and reactions with both layers are initiated. Once the reactions have been completed, a strong bond system 16 is provided across the insulation/propellant interface. Indeed, the IPDI results in a higher concentration of strong urethane bonds near the propellant interface than in the propellant as a whole. Thus, the strongest part of the propellant may be at the interface, if the process parameters are chosen to achieve this result.

As illustrated in FIG. 1, added materials may also contribute to increased bond strength across the interface. In the illustrated embodiment, additives such as HX 752 are shown to result in additional bonding across the interface.

The right hand portion of FIG. 1 illustrates the results of the use of the IBS. That is, the propellant and the insulation are securely bonded to one another and the intermediate layer is eliminated.

In developing the system, it has been found that a number of process parameters can be easily controlled in order to provide specific desired bonding characteristics. For example, it is possible to choose an insulation material which has a specific permeability to the reactive material (such as IPDI, or an IPDI solution) such that the extent of the reaction between the materials can be controlled. It is also possible to control the time ($t_1$) between the application of the IPDI to the insulation layer and the addition of the propellant in order to control the reaction between the insulation and the IPDI. Finally, the amount of reactive material (also referred to as "level") applied can be controlled.

In tests conducted on this system, it was found that good results could be achieved, and the characteristics of the final product could be controlled, by control of the process parameters mentioned above. Specifically, the present invention provides propellant/insulation bonds with peel and tensile strengths which are generally insensitive to aging. In addition, the methods of the present invention have been successfully applied in a number of propellant and insulation combinations.

a. Presentation and Discussion of Data

In tests performed using the system, good bonding has been achieved with a wide variety of HTPB-based propellants, and with a wide variety of insulations. Some examples of the systems tested include the following:

dizer, and solid burn rate modifiers. Accordingly, it will be appreciated that the present invention has been shown to work with a variety of conventional types of propellants and insulators.

As mentioned above, the present invention works because of diffusion of the reactive material into the insulation. However, additional reaction takes place on the surface of the insulation. This combination provides adequate interfacial adhesion with the propellant. At the same time the reactive material (IPDI or IPDI with added materials) diffuses into the propellant and cross-links there. This eliminates the usual soft layer and increases the interface cross-link density by additional propellant/binder urethane bond formation and from aziridine homopolymerization in cases where aziridines are added.

Figure 2:
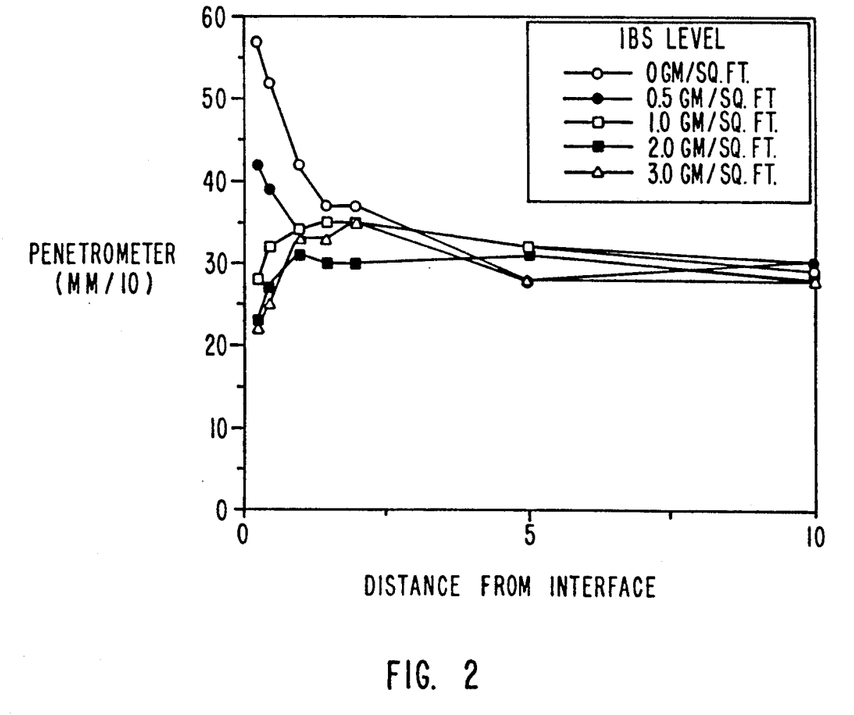
FIG. 2 is a graph illustrating the effect of the level of the reactive material on the propellant interface hardness.

FIG. 2 is a graphical presentation of data obtained regarding hardness of the propellant near the interface with the insulation layer. All measurements where taken with a penetrometer and refer to penetration distance into the materials. The system used to produce these data was comprised of the TP H1207C propellant and the 3488 (Kevlar® filled EPDM) insulation. As illustrated in FIG. 2, when the IBS level reaches a certain point (between about 0.5 gm/ft$^2$ and about 1.0 gm/ft$^2$ for the system tested), the hardness at the interface is actually greater than the hardness of the propellant as a whole. Thus, it has been found that in cases in which failure occurs, it occurs within the propellant and not at the bonded interface. This is the desired locus of failure. In most preferred embodiments, levels in the range of from approximately 0.25 gm/ft$^2$ to approximately 5.0 gm/ft$^2$ provide good results.

Figure 3:
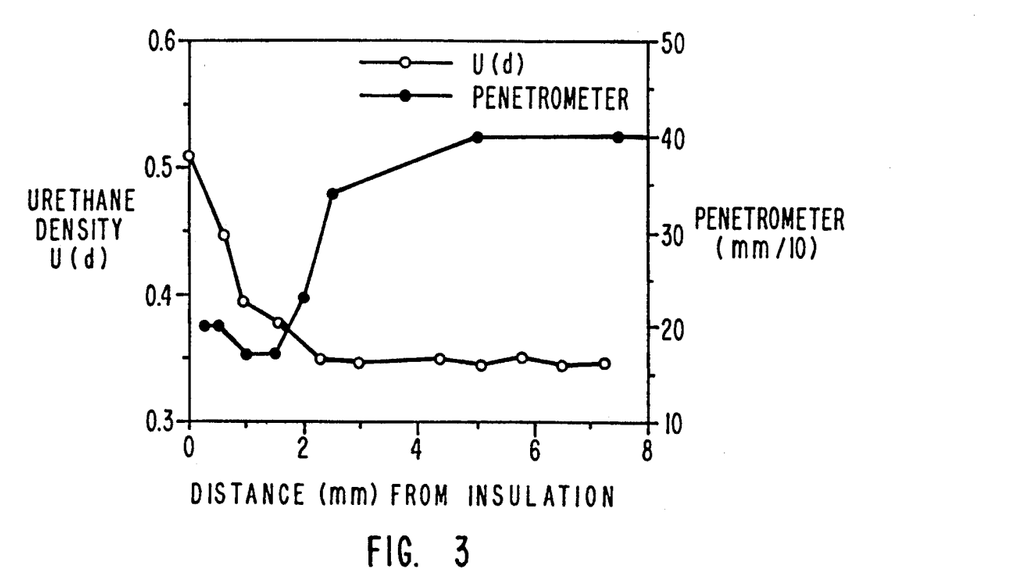
FIG. 3 is a graph illustrating the urethane density of the propellant plotted against distance from the bonded insulation layer interface.

FIG. 3 presents related data. FIG. 3 is a urethane density profile for a chosen system which includes a

| PROPELLANTS | INSULATIONS | IBS SYSTEM (REACTIVE MATERIAL) |
| --- | --- | --- |
| TP H1207C | 053A (SiO$_2$/EPDM) | HX-868/IPDI |
|  | 1552 (SiO$_2$/EPDM) | SiO$_2$/HX-868/IPDI |
|  | 3488 (Kev/EPDM) | HX-752/IPDI |
| TP H1205C | DL 1799 (EPDM) | HX-868/IPDI |
|  | WS 20889 (Asb/PI) | IPDI |
| TP H1159 | WS 20889 | HX-868/IPDI |
|  | DL 1799 | IPDI |
|  | 053A |  |
|  | 1552 |  |
| DL H433 (AN-CLEAR) | 1552 | HX-868/IPDI |
|  | DL 1799 |  |
| DL H435 (Mg-CLEAN) | 053A | HX-868/IPDI |
|  | 1552 | HX-752/IPDI |
|  | DL 3313A (TPE) |  |
|  | DL 3313K (KEV/TPE) |  |
|  | DL 3488 (KEV/EPDM) |  |
|  | DL 3866 (TPE) |  |
|  | DL 4165 (TPE) |  |

The propellant identified as TP H1207C is a conventional composite propellant having an HTPB/IPDI binder, aluminum fuel, and ammonium perchlorate oxidizer. The propellant identified as TP 1205C is a plasticized composite propellant having a HTPB/IPDI binder, aluminum fuel, ammonium perchlorate oxidizer, an inert plasticizer, and liquid burn rate modifiers. The propellant identified as TP H1159 is a low signature composite propellant having a HTPB/IPDI binder, and an ammonium perchlorate oxidizer. The propellant identified as DL H433 has a HTPB/IPDI binder, aluminum fuel, and ammonium nitrate oxidizer. Finally, the propellant identified as DL H435 has a HTPB/IPDI binder, magnesium fuel, ammonium perchlorate oxisolution of HX-868 aziridine in IPDI, the TP H1207C propellant, and the 053A (SiO$_2$/EPDM) insulator. This graph indicates that the urethane density decreases as one moves away from the bonded interface and into the propellant at large. This is a further indication that the bond produced by the present invention results in an increase in urethane bonds and a stronger region near the bonded interface.

Table I illustrates the general effect of the concentration of aziridine in the IPDI solution. The first column shows the percentage of aziridine (HX-868) in the IPDI solution. The second column lists peel value. The remaining columns list penetrometer readings which provide an indication of hardness. The column headed by "I" is the insulation layer and the number headings of the other columns represent the distance in millimeters away from the interface and into the propellant. Generally, the data presented in Table I indicate that good results are obtained over the entire range of concentrations which were tested in these runs (0.5% to 40%).

TABLE I

EFFECT OF HX-868 AZIRIDINE LEVEL ON IBS BOND STRENGTH TP H1207C PROPELLANT 053A INSULATION

| PERCENT HX-868 | PEEL VALUE | PENETROMETER |||||||||
|---|---|---|---|---|---|---|---|---|---|---|
| | | I | 0.3 | 0.5 | 1.0 | 1.5 | 2.0 | 2.5 | 5.0 | 10.0 | 15.0 |
| 0.5 | 14.0 | 10 | 20 | 20 | 17 | 17 | 23 | 34 | 40 | 40 | 42 |
| 1.0 | 14.6 | 12 | 21 | 18 | 16 | 21 | 32 | 38 | 40 | 42 | 39 |
| 2.5 | 15.9 | 11 | 16 | 20 | 27 | 37 | 41 | 42 | 42 | 39 | 43 |
| 5.0 | 15.7 | 10 | 13 | 15 | 22 | 36 | 36 | 41 | 41 | 39 | 42 |
| 10.0 | 15.7 | 12 | 16 | 17 | 17 | 15 | 28 | 36 | 42 | 40 | 41 |
| 20.0 | 14.5 | 12 | 13 | 15 | 29 | 36 | 42 | 43 | 46 | 43 | 43 |
| 40.0 | 13.0 | 11 | 15 | 14 | 27 | 36 | 42 | 43 | 43 | 43 | 41 |

As mentioned above, some of the process variables that can easily be controlled to good effect are the time ($t_1$) and the level or amount of reactive material applied. Table II presents data for a representative system illustrating the general effects of varying time and level.

TABLE II

IBS Bonding of TP H1207C Propellant to DL-3488 Insulator Effects of $t_1$ and Level

| $t_1$ (day) | Level (g/ft²) | Peel (pli) | AFT Tensile (psi) | Penetrometer |||||||||
|---|---|---|---|---|---|---|---|---|---|---|---|---|
| | | | | I | 0.3 | 0.5 | 1.0 | 1.5 | 2.0 | 2.5 | 5.0 | 7.5 | 10 | 15 |
| 1 | 0.5 | 12.2 | 193 | 6 | 32 | 33 | 33 | 32 | 32 | 31 | 30 | 29 | 27 | 28 |
| 1 | 1.0 | 12.6 | 196 | 7 | 27 | 28 | 31 | 31 | 32 | 30 | 30 | 29 | 28 | 27 |
| 1 | 2.0 | 9.5 | 202 | 7 | 15 | 17 | 26 | 29 | 30 | 31 | 31 | 30 | 28 | 28 |
| 1 | 4.0 | 9.3 | 220 | 6 | 7 | 9 | 16 | 24 | 26 | 27 | 28 | 28 | 27 | 27 |
| 3 | 0 | 2.5 | 123 | 9 | 48 | 46 | 38 | 32 | 30 | 30 | 29 | 30 | 28 | 28 |
| 3 | 0.5 | 5.6 | 163 | 7 | 36 | 36 | 33 | 33 | 32 | 30 | 31 | 30 | 29 | 28 |
| 3 | 2.0 | 10.8 | 192 | 6 | 16 | 24 | 30 | 31 | 31 | 30 | 29 | 28 | 27 | 27 |
| 3 | 4.0 | 9.1 | 205 | 6 | 12 | 16 | 24 | 27 | 29 | 30 | 30 | 28 | 28 | 28 |
| 5 | 1.0 | 8.1 | 175 | 7 | 35 | 37 | 35 | 31 | 32 | 34 | 30 | 29 | 30 | 30 |
| 5 | 2.0 | 13.0 | 180 | 8 | 23 | 27 | 35 | 32 | 33 | 33 | 32 | 32 | 31 | 30 |
| 5 | 4.0 | 10.9 | 184 | 7 | 16 | 24 | 30 | 33 | 33 | 33 | 32 | 31 | 30 | 30 |
| 7 | 0.5 | 4.8 | 155 | 8 | 40 | 41 | 36 | 33 | 31 | 32 | 29 | 27 | 26 | 27 |
| 7 | 2.0 | 10.0 | 190 | 8 | 30 | 31 | 32 | 31 | 28 | 30 | 27 | 27 | 27 | 27 |
| 7 | 4.0 | 14.1 | 196 | 7 | 19 | 23 | 30 | 30 | 28 | 29 | 27 | 28 | 26 | 27 |

Figure 4:
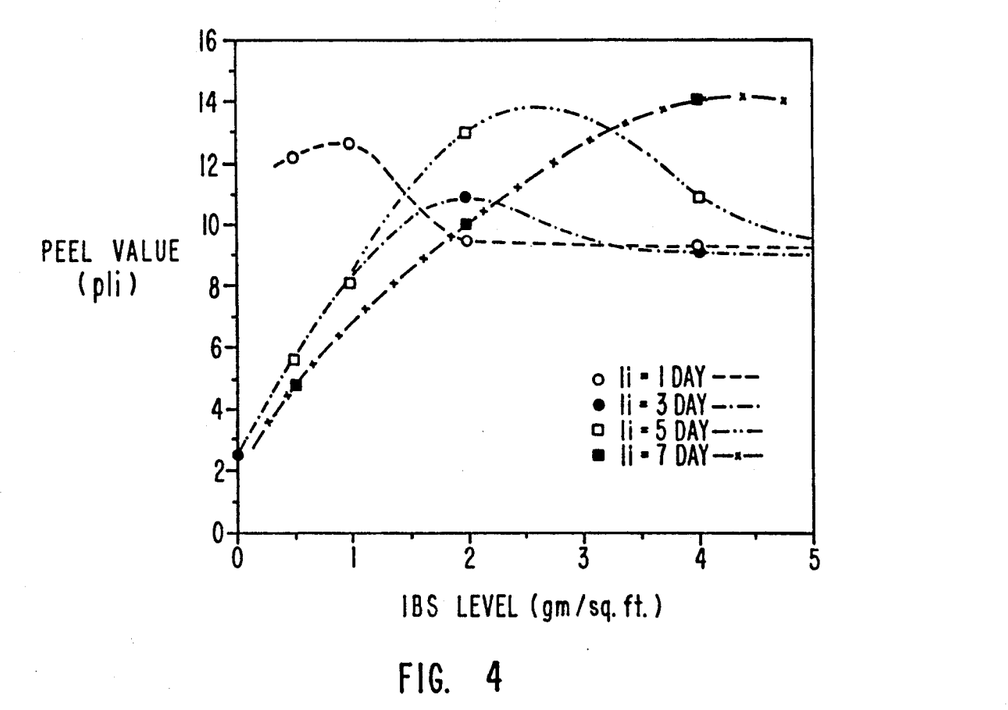
FIG. 4 is a graph plotting the peel value of systems having a series of times ($t_1$) against level of reactive material.
Figure 5:
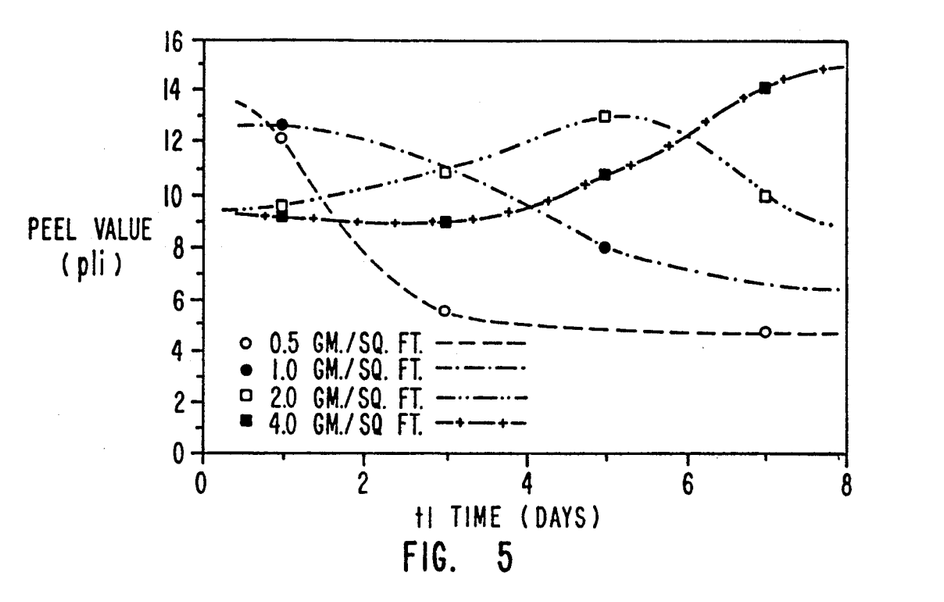
FIG. 5 is a graph which plots peel value against the time ($t_1$) for samples having a variety of levels of reactive material.

FIGS. 4 and 5 present additional data indicating that good bonds are being formed between the insulation layer and the HTPB-based propellant layer. FIG. 4 illustrates data from a representative system and plots peel value against level of reactive material (IBS level). It can be seen that peel values easily exceed 8 pli for levels in excess of 1 gm/ft². Similarly, FIG. 5 indicates that good peel values are easily achieved over a wide range of times.

Tables III and IV present additional data in this respect. Table III shows the effect of IBS level at a constant time (i.e. 3 days). The propellant used is identified as DL-H435 which includes an HTPB/IPDI binder, magnesium fuel, ammonium perchlorate oxidizer, and solid burn rate modifiers. The insulations used include 1552A, a silica filled EPDM insulation, and 3488, a Kevlar ® filled EPDM insulation.

TABLE III

EFFECT OF IBS LEVEL: DL-H435 Propellant $t_1$ = 3 days

| Insulation | Level (gm/ft²) | Peel (pli) | AFT (psi) | Penetrometer |||||||||
|---|---|---|---|---|---|---|---|---|---|---|---|
| | | | | I | 0.3 | 0.5 | 1.0 | 1.5 | 2.0 | 6 | 10 | 15 |
| 1552A | 1.0 | 9.8 | 130 | 10 | 23 | 26 | 30 | 29 | 30 | 28 | 25 | 30 |
| | 2.0 | 10.4 | 148 | 10 | 12 | 14 | 22 | 23 | 24 | 24 | 23 | 23 |
| | 3.0 | 5.1 | 132 | 10 | 14 | 16 | 24 | 27 | 29 | 27 | 27 | 28 |
| | 6.0 | 3.8 | 114 | 10 | 16 | 15 | 28 | 30 | 30 | 28 | 29 | 28 |
| 3488 | 0 | 0.8 | 72 | 10 | 57 | 52 | 42 | 37 | 37 | 28 | 30 | 28 |
| | 0.5 | 4.2 | 110 | 9 | 42 | 39 | 34 | 35 | 35 | 32 | 30 | 31 |
| | 1.0 | 9.1 | 125 | 10 | 28 | 32 | 34 | 35 | 35 | 32 | 29 | 28 |
| | 2.0 | 16.3 | 145 | 10 | 23 | 27 | 31 | 30 | 30 | 31 | 28 | 28 |
| | 3.0 | 16.6 | 137 | 7 | 22 | 25 | 33 | 33 | 35 | 28 | 28 | 28 |

Table IV presents data regarding the effect of time and level on a system comprised of the DL H435 propellant, with DL 3488, an EPDM/Kevlar ® filled insulation, and DL 1552, a EPDM/silica filled insulation. Again the data generated indicate that good bond strength is achieved over a wide range of time and level. The data also indicate that specific bonding characteristics can be achieved by varying the process parameters.

TABLE IV

IBS Bonding of DL-H435 Propellant Effect of $t_1$ and Level
IBS Solution: 10% HX 752/IPDI; Undried, Unbuffed, Unwiped, Patterned Insulation

| Insulation | $t_1$ (day) | Level (gm/ft²) | Peel Value (pli) | AFT Tensile (psi) | Penetrometer |||||||||
|---|---|---|---|---|---|---|---|---|---|---|---|---|
| | | | | | I | 0.3 | 0.5 | 1.0 | 1.5 | 2.0 | 2.5 | 5 | 10 | 15 |
| DL 3488 | 1 | 0.5 | 18.7 | >150* | 7 | 18 | 21 | 23 | 25 | 23 | 24 | 24 | 25 | 24 |
| | 1 | 2.0 | 12.3 | >158* | 6 | 13 | 12 | 17 | 21 | 22 | 23 | 24 | 24 | 24 |
| | 1 | 4.0 | 2.9 | 134 | 6 | 23 | 20 | 18 | 17 | 23 | 21 | 24 | 23 | 24 |

TABLE IV-continued

IBS Bonding of DL-H435 Propellant Effect of $t_1$ and Level
IBS Solution: 10% HX 752/IPDI; Undried, Unbuffed, Unwiped, Patterned Insulation

| Insulation | $t_1$ (day) | Level (gm/ft$^2$) | Peel Value (pli) | AFT Tensile (psi) | Penetrometer | | | | | | | | | |
|---|---|---|---|---|---|---|---|---|---|---|---|---|---|---|
| | | | | | 1 | 0.3 | 0.5 | 1.0 | 1.5 | 2.0 | 2.5 | 5 | 10 | 15 |
| | 3 | 0 | 3.4 | 120 | 6 | 27 | 25 | 24 | 23 | 24 | 24 | 25 | 24 | 24 |
| | 3 | 0.5 | 17.1 | >152* | 6 | 18 | 18 | 20 | 23 | 23 | 24 | 25 | 23 | 25 |
| | 3 | 2.0 | 18.2 | >163* | 7 | 13 | 15 | 19 | 23 | 24 | 23 | 24 | 24 | 23 |
| | 3 | 4.0 | 6.7 | 162 | 8 | 12 | 13 | 16 | 18 | 22 | 24 | 25 | 23 | 24 |
| | 7 | 0.5 | 10.3 | 146 | 6 | 21 | 24 | 24 | 23 | 24 | 24 | 24 | 25 | 24 |
| | 7 | 2.0 | 17.1 | 157 | 8 | 17 | 19 | 23 | 25 | 25 | 25 | 24 | 24 | 25 |
| | 7 | 4.0 | 17.5 | >150* | 7 | 13 | 13 | 18 | 23 | 23 | 24 | 24 | 24 | 24 |
| DL 1552 | 1 | 2.0 | 12.2 | 163 | 9 | 12 | 12 | 14 | 22 | 25 | 22 | 24 | 24 | 24 |
| | 3 | 0.5 | 10.0 | 155 | 9 | 23 | 25 | 24 | 25 | 24 | 25 | 24 | 26 | 25 |
| | 3 | 2.0 | 11.0 | 162 | 9 | 12 | 13 | 21 | 24 | 24 | 24 | 23 | 24 | 24 |
| | 7 | 2.0 | 13.4 | 156 | 10 | 16 | 21 | 23 | 25 | 26 | 24 | 24 | 24 | 23 |

*insulation - tab secondary bond failure

A further important factor in the design of a desirable bonding system is the shelf life of the IBS. Using the present invention, however, it is found that $t_1$ values up to 70 days and beyond still result in good bond formation. Table V presents some representative data showing the long shelf life in multiple insulation/propellant systems. The data relate to the DL H435 propellent and 3488, a Kevlar ® filled EPDM insulation, and 1552, a silica filled EPDM insulation.

TABLE V

| Shelf Life Studies Level = 2.0 g/ft$^2$ | | | | |
|---|---|---|---|---|
| Propellant | Insulation | $t_1$ | Peel | AFT |
| DL H435 | 3488 | 14 | 9.6 | 154 |
| | | 70 | 9.7 | 161 |
| DL H435 | 1552 | 70 | 7.0 | 148 |
| DL H453 | 3488 | 20 | 16 | >169 |
| DL H453 | 1552 | 20 | 12.5 | 166 |

Another factor influencing the system is the permeability of the insulator. It is found the various insulators vary widely in permeability to reactive materials such as IPDI and IPDI solutions. Since the bonding system depends upon the availability of the reactive material to diffuse into the propellant, it is necessary to vary time and level to take into consideration IPDI permeability. For insulations with high permeabilities, the reactive material will be rapidly taken up by the insulation. Accordingly, high levels of reactive material and short times may be required. When the insulation has a low permeability, long times and low levels will be preferred.

Figure 6A:
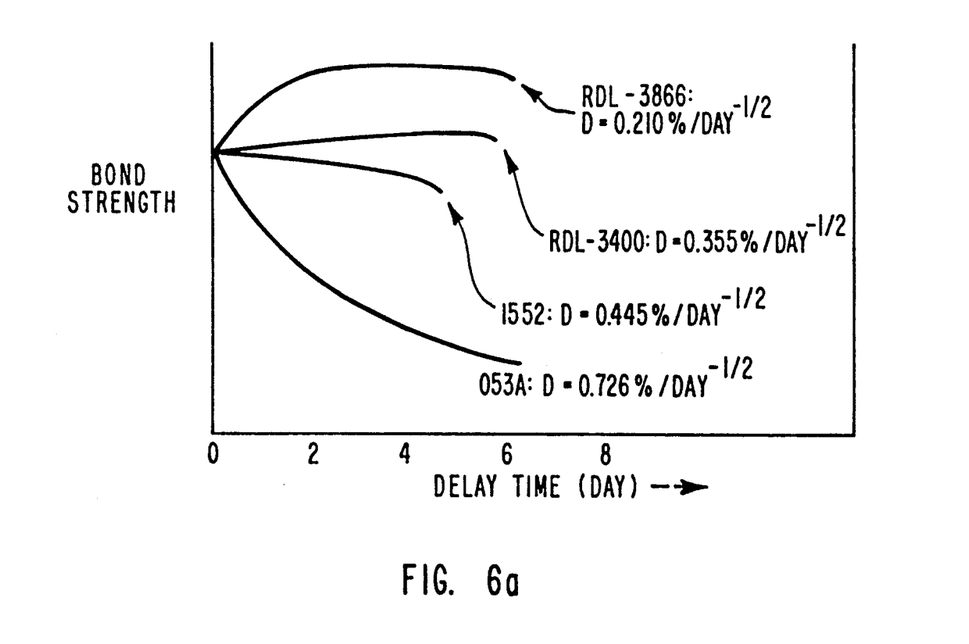
FIG. 6a is a graph plotting bond strength against time.
Figure 6B:
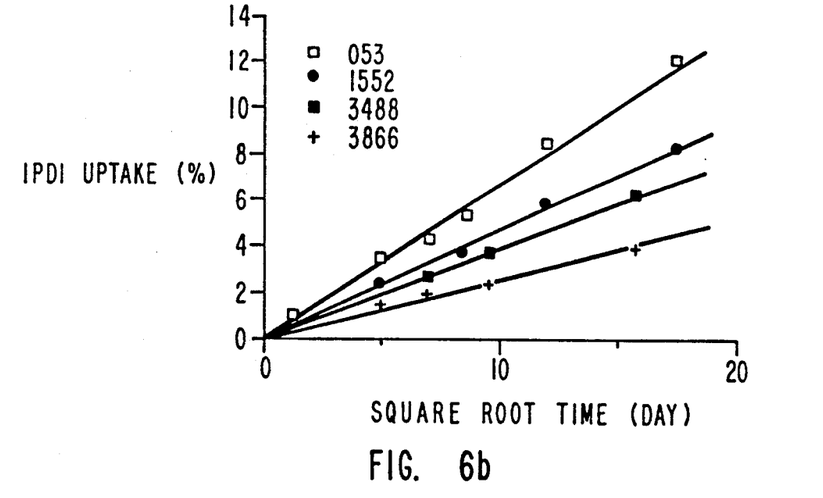
FIG. 6b is a graph plotting IPDI uptake against the square root of time.

This concept is illustrated in FIGS. 6a and 6b for a variety of systems. FIG. 6a is a plot of bond strength against delay time in days. FIG. 6b is a corresponding plot of percentage uptake against time, for a measure of permeability.

Many liner bond systems exhibit a significant reduction in peel values on aging. The principal mechanism for this reduction is an increase in the liner modulus with age. It is believed that this occurs because of the continued reaction of aziridine with the liner.

This mechanism predicts that the bond system should exhibit stable peel values as long as the insulation modulus is unchanged on aging. This is generally found to be the case. Tensile adhesion values generally increase slightly due to increases in interface and bulk propellant hardness due to post curing.

Tables VI and VII summarize data generated on the aging of DL H435 and TP H1207C propellants bonded to 3488, 1552, and 053A insulations.

TABLE VI

Aging of IBS Bonded Systems; TP H1207C Propellant
IBS: 2% SiO$_2$/10% HX-868/IPDI; Level = 2.0 gm/ft$^2$; $t_1$ = 3 day

| Insulation | Time (mo.) | Temp (F.) | Humidity (RH) | Peel (pli) | AFT (psi) | Penetrometer | | | | | | | | | |
|---|---|---|---|---|---|---|---|---|---|---|---|---|---|---|---|
| | | | | | | 1 | 0.3 | 0.5 | 1.0 | 1.5 | 2.0 | 2.5 | 5 | 10 | 1? |
| 053A | 0 | — | amb | 14.803 | — | 10 | 16 | 16 | 16 | 15 | 17 | 18 | 18 | 17 | 15 |
| | 1 | 135 | amb | 14.6 | 311 | 10 | 11 | 13 | 14 | 17 | 18 | 20 | 18 | 17 | 19 |
| | 2 | 75 | amb | 13.2 | 181 | 12 | 13 | 14 | 20 | 23 | 24 | 26 | 26 | 25 | 26 |
| | 2 | 105 | 70% | 8.2 | 152 | 10 | 16 | 20 | 24 | 27 | 28 | 29 | 28 | 26 | 26 |
| | 4 | 135 | amb | 13.0 | 294 | 12 | 13 | 14 | 16 | 18 | 20 | 21 | 21 | 22 | 21 |
| | 8 | 75 | amb | 11.3 | 188 | 10 | 21 | 25 | 27 | 29 | 33 | 32 | 32 | 31 | 32 |
| | 8 | 135 | amb | 13.4 | 309 | 10 | 13 | 15 | 17 | 19 | 18 | 20 | 21 | 20 | 20 |
| | 8 | 105 | 70% | 5.0 | 140 | 10 | 23 | 27 | 35 | 37 | 37 | 38 | 38 | 35 | 34 |
| 1552 | 0 | — | amb | 8.9 | — | 9 | 14 | 15 | 16 | 18 | 21 | 24 | 25 | 25 | 26 |
| | 1 | 135 | amb | 9.1 | 176 | 9 | 9 | 11 | 17 | 19 | 22 | 27 | 29 | 29 | 28 |
| | 2 | 75 | amb | 8.3 | 203 | 10 | 9 | 12 | 15 | 19 | 20 | 21 | 21 | 21 | 21 |
| | 2 | 105 | 70% | 5.2 | 146 | 11 | 10 | 14 | 19 | 23 | 25 | 26 | 27 | 25 | 25 |
| | 4 | 135 | amb | 9.2 | 177 | 11 | 10 | 14 | 23 | 26 | 31 | 33 | 33 | 31 | 32 |
| | 8 | 75 | amb | 8.2 | 205 | 11 | 14 | 15 | 20 | 25 | 29 | 29 | 28 | 26 | 27 |
| | 8 | 135 | amg | 8.9 | 191 | 8 | 12 | 17 | 21 | 24 | 27 | 28 | 29 | 29 | 30 |
| | 8 | 105 | 70% | 4.2 | 134 | 9 | 20 | 18 | 24 | 30 | 34 | 38 | 41 | 39 | 37 |

TABLE VII

Aging Effects in IBS Bonded Non-dried Insulations: DL-H435 Propellant
Level = 2.0 gm/ft$^2$; t$_1$ = 3 days

| Insulation | Aging Time (mos) | Aging Temp (F.) | Peel (pli) | AFT (psi) | Penetrometer 1 | 0.3 | 0.5 | 1.0 | 1.5 | 2.0 | 5 | 10 | 15 |
|---|---|---|---|---|---|---|---|---|---|---|---|---|---|
| 2A | 0 | — | 11.0 | 149 | 9 | 17 | 21 | 23 | 26 | 26 | 24 | 25 | 24 |
|  | 1 | 135 | 11.6 | 135 | 10 | 27 | 30 | 29 | 30 | 31 | 26 | 27 | 23 |
|  | 2 | 75 | 9.7 | 121 | 11 | 25 | 27 | 27 | 30 | 31 | 27 | 29 | 28 |
|  | 2 | 135 | 12.3 | 153 | 12 | 24 | 25 | 27 | 26 | 24 | 26 | 26 | 27 |
|  | 4 | 135 | 13.7 | 158 | 11 | 19 | 23 | 21 | 25 | 24 | 24 | 22 | 22 |
| 3488 | 0 | — | 14.8 | 151 | 8 | 23 | 26 | 29 | 25 | 27 | 25 | 25 | 25 |
|  | 1 | 135 | 15.5 | 165 | 6 | 18 | 23 | 22 | 24 | 23 | 19 | 18 | 21 |
|  | 2 | 75 | 15.5 | 141 | 11 | 20 | 23 | 25 | 28 | 29 | 28 | 28 | 26 |
|  | 2 | 135 | 14.9 | 178 | 9 | 18 | 20 | 25 | 24 | 27 | 19 | 22 | 24 |
|  | 4 | 135 | 14.6 | 165 | 8 | 16 | 19 | 19 | 22 | 22 | 22 | 21 | 20 |

The surface properties of insulations are critical to bonding with the present invention, as with conventional liner systems. The usual preparatory procedure involves buffing, solvent wiping, and drying. The purpose of the buff step is generally two-fold: (1) to produce a chemically clean surface, and (2) to create mechanical inter-locking features. The wiping removes the buffing residue plus any other contaminants. It is thought, however, that this step probably introduces more foreign material than it removes. The drying step removes moisture and residual solvent.

In the present invention, an important consideration is the run off of the reactive material, especially in vertical application and storage. If will be appreciated that the usual rocket motor is cylindrical in configuration. Thus, it is necessary to apply the reactive material to the "top" of the cylinder.

It has been found that a patterned insulation layer greatly reduced flow of the reactive material coating. Patterns also result in a much more homogeneous surface for bonding. In addition, it is found that pattern produces excellent surfaces for bonding. The pattern may indeed eliminate the need for buffing and wiping of the insulator.

In one procedure, the patterned cloth is co-cured with the insulation. The cloth is then simply peeled away, leaving a corresponding pattern. Three different patterns have been tested and found to produce good results. These patterns include a dacron cloth, a stern weave, and chic-a-pee cloth. Table VIII summarizes the effects of these patterned cloths, all of which produce good results.

TABLE VIII

Buffing/Wiping vs. Patterned Insulation Surface;
DL-H435 Propellant; t$_1$ = 3 days; Level = 2.0 gm/ft$^2$;

| Insulation/ Condition | Peel (pli) | AFT (psi) | Penetrometer 1 | 0.3 | 0.5 | 1.0 | 1.5 | 2.0 | 6 | 10 | 15 |
|---|---|---|---|---|---|---|---|---|---|---|---|
| 1552A |  |  |  |  |  |  |  |  |  |  |  |
| buffed/wiped | 10.4 | 148 | 10 | 12 | 16 | 22 | 23 | 24 | 24 | 23 | 23 |
| dacron | 11.0 | 149 | 9 | 17 | 21 | 23 | 26 | 26 | 24 | 23 | 24 |
| stern | 10.7 | 148 | 12 | 23 | 27 | 29 | 28 | 29 | 24 | 25 | 24 |
| chic-a-pee | 9.4 | 151 | 10 | 20 | 24 | 26 | 26 | 27 | 25 | 26 | 24 |
| 3488 |  |  |  |  |  |  |  |  |  |  |  |
| buffed/wiped | 13.5 | 153 |  |  |  |  |  |  |  |  |  |
| dacron | 13.5 | 151 | 8 | 23 | 26 | 29 | 25 | 26 | 27 | 24 | 25 |
| stern | 14.9 | 152 | 9 | 23 | 24 | 28 | 26 | 27 | 25 | 25 | 25 |
| chic-a-pee | 11.1 | 153 | 11 | 26 | 27 | 29 | 26 | 27 | 27 | 26 | 26 |

Another concern in conventional systems is the level of moisture in the system. This is true because trace moisture levels in the liner reacts with the isocyanate, making it unavailable for liner formation and, therefore, reduces liner strength. The present invention is much less sensitive to moisture in that a reduction in the isocyanate levels merely lowers the amount available for diffusion into the propellant, which does not affect bond properties. In tests run on various samples it was found that trace moisture had little effect. Peel values and tensile strength were compared for systems using "as received" insulations and insulations dried for three (3) days. In each case it was found that only slight variations resulted.

Accordingly, it will be appreciated that the data presented confirm the effectiveness of the present invention. It is found that by using the interpenetrating bonding system described above, a good bond is achieved directly between the insulation layer and the propellant. Indeed, using the HTPB-based propellant and the IPDI reactive material, additional urethane bonds are formed at the interface between the propellant and the insulation and interface propellant reinforcement occurs. Thus, the propellant near the interface has an increase in hardness.

At the same time, it is a simple matter to vary process parameters in order to achieve specific results. Variations in time, over wide ranges, provides excellent results. At the same time, changes in level over a wide range also provides excellent bonding. It is also possible to chose an insulator of specific permeability and to tailor the time factor accordingly in order to achieve specific bonding characteristics.

EXAMPLES

The following examples illustrate various aspects of the invention, but it will be obvious that various changes and modifications may be made therein without departing from the scope of the invention. Accordingly, it will be appreciated that these examples are only exemplary of the many different embodiments of this invention.

EXAMPLE 1

In this example, the interpenetrating bonding system of the present invention was employed in order to bond a typical HTPB-based propellent to a EPDM insulator. Specifically the propellant was identified as TP H1207C, which is a conventional composite propellant having a HTPB/IPDI binder, aluminum fuel, and ammonium perchlorate oxidizer. The insulator was identified as DL-3488, which is a Kevlar® filled EPDM insulator.

In this example 1.0 grams/ft² of IPDI was applied to the insulator for a period of 1 day. At that point, the propellant was added and bonded to the insulator.

If was found that a good bond was achieved. Peel value in pli was measured at 12.6. AFT tensile strength in psi was measured at 196. Representative penetrometer measurements at the interface were as follows:

| Interface | 6 |
|---|---|
| 0.3 mm | 27 |
| 0.5 | 28 |
| 1.0 | 31 |
| 1.5 | 31 |
| 2.0 | 32 |
| 2.5 | 30 |
| 5.0 | 30 |
| 7.5 | 29 |
| 10 | 28 |
| 15 | 27 |

This example illustrates the methods and compositions of the present invention and the fact that good bonding can be achieved between the insulation layer and the propellant without the need for a liner.

EXAMPLE 2

In this example, the interpenetrating bonding system of the present invention was employed in order to bond a typical HTPB-based propellent to a EPDM insulation. Specifically the propellant was the TP H1207C propellant identified above. The insulation was identified as 053A, which is a silica filled, sulphur, cured EPDM insulation.

In this example, a solution of 0.5% HX-868 aziridine in IPDI was applied to the insulator. At that point, the propellant was added and bonded to the insulator.

If was found that a good bond was achieved. Peel value in pli was measured at 14.0. Representative penetrometer measurements at the interface were as follows:

| Interface | 10 |
|---|---|
| 0.3 mm | 20 |
| 0.5 | 20 |
| 1.0 | 17 |
| 1.5 | 17 |
| 2.0 | 23 |
| 2.5 | 34 |
| 5.0 | 40 |
| 10 | 40 |
| 15 | 42 |

This example illustrates the methods and compositions of the present invention and the fact that good bonding can be achieved between the insulation layer and the propellant without the need for a liner. It also illustrates the effectiveness of a small concentration of aziridine in the IPDI.

EXAMPLE 3

In this example, the interpenetrating bonding system of the present invention was employed in order to bond a typical HTPB-based propellent to a EPDM insulation. Specifically the propellant was the TP H1207C propellant identified above. The insulation was the 053A identified above.

In this example a solution of 10.0% HX-868 aziridine in IPDI was applied to the insulator. At that point, the propellant was added and bonded to the insulator.

If was found that a good bond was achieved. Peel value in pli was measured at 15.7. Representative penetrometer measurements at the interface were as follows:

| Interface | 12 |
|---|---|
| 0.3 mm | 16 |
| 0.5 | 17 |
| 1.0 | 17 |
| 1.5 | 15 |
| 2.0 | 28 |
| 2.5 | 36 |
| 5.0 | 42 |
| 10 | 40 |
| 15 | 41 |

This example illustrates the methods and compositions of the present invention and the fact that good bonding can be achieved between the insulation layer and the propellant without the need for a liner. It also illustrates the effectiveness of an intermediate concentration of aziridine in the IPDI.

EXAMPLE 4

In this example, the interpenetrating bonding system of the present invention was employed in order to bond a typical HTPB-based propellent to a EPDM insulation. The propellant was the TP H1207C propellant identified above. The insulation was the 053A identified above.

In this example a solution of 40.0% HX-868 aziridine in IPDI was applied to the insulator. At that point, the propellant was added and bonded to the insulator.

If was found that a good bond was achieved. Peel value in pli was measured at 13.0. Representative penetrometer measurements at the interface were as follows:

| Interface | 11 |
|---|---|
| 0.3 mm | 15 |
| 0.5 | 14 |
| 1.0 | 27 |
| 1.5 | 36 |
| 2.0 | 42 |
| 2.5 | 43 |
| 5.0 | 43 |
| 10 | 43 |
| 15 | 41 |

This example illustrates the methods and compositions of the present invention and the fact that good bonding can be achieved between the insulation layer and the propellant without the need for a liner. It also illustrates the effectiveness of a relatively high concentration of aziridine in the IPDI.

EXAMPLE 5

In this example, the interpenetrating bonding system of the present invention was employed in order to bond a typical HTPB-based propellent to a EPDM insulation. Specifically the propellant was the DL-H435 propellant identified above. The insulation was identified as 3488, which is a Kevlar ® filled EPDM insulation.

In this example 2.0 grams/ft² of IPDI was applied to the insulator. After 3 days the propellant was added and bonded to the insulator. If was found that a good bond was achieved. Peel value in pli was measured at 16.3. AFT tensile strength was 145 psi. Representative penetrometer measurements at the interface were as follows:

| Interface | 10 |
|---|---|
| 0.3 mm | 23 |
| 0.5 | 27 |
| 1.0 | 31 |
| 1.5 | 30 |
| 2.0 | 30 |
| 5.0 | 31 |
| 10 | 28 |
| 15 | 28 |

This example illustrates the methods and compositions of the present invention and the fact that good bonding can be achieved between the insulation layer and the propellant without the need for a liner. It also illustrates the effectiveness of a time value of 3 days.

EXAMPLE 6

In this example, the interpenetrating bonding system of the present invention was employed in order to bond a typical HTPB-based propellant to a EPDM insulation. Specifically the propellant was the DL-H435 propellant identified above. The insulation was the 3488 insulation identified above.

In this example 2.0 grams/ft$^2$ of IPDI was applied to the insulator. After 14 days the propellant was added and bonded to the insulator. If was found that a good bond was achieved. Peel value in pli was measured at 9.6. AFT tensile strength was 154 psi.

This example illustrates the methods and compositions of the present invention and the fact that good bonding can be achieved between the insulation layer and the propellant without the need for a liner. It also illustrates the effectiveness of a shelf life of 14 days.

EXAMPLE 7

In this example, the interpenetrating bonding system of the present invention was employed in order to bond a typical HTPB-based propellant to a EPDM insulation. Specifically the propellant was the DL-H435 propellant identified above. The insulation was the 3488 insulation identified above.

In this example 2.0 grams/ft$^2$ of IPDI was applied to the insulator. After 20 days the propellant was added and bonded to the insulator. If was found that a good bond was achieved. Peel value in pli was measured at 16. AFT tensile strength was >169 psi.

This example illustrates the methods and compositions of the present invention and the fact that good bonding can be achieved between the insulation layer and the propellant without the need for a liner. It also illustrates the effectiveness of a shelf life of 20 days.

EXAMPLE 8

In this example, the interpenetrating bonding system of the present invention was employed in order to bond a typical HTPB-based propellant to a TPE insulation. Specifically the propellant was the DL-H435 propellant identified above. The insulation was identified as 1552A, which is a silica filled EPDM insulation.

In this example 1.0 grams/ft$^2$ of IPDI was applied to the insulator. After 3 days the propellant was added and bonded to the insulator. If was found that a good bond was achieved. Peel value in pli was measured at 9.8. AFT tensile strength was 130 psi. Representative penetrometer measurements at the interface were as follows:

| Interface | 10 |
|---|---|
| 0.3 mm | 23 |
| 0.5 | 26 |
| 1.5 | 29 |
| 2.0 | 30 |
| 5.0 | 28 |
| 10 | 25 |
| 15 | 30 |

This example illustrates the methods and compositions of the present invention and the fact that good bonding can be achieved between the insulation layer and the propellant without the need for a liner. It also illustrates the effectiveness of a relatively low level of IPDI.

EXAMPLE 9

In this example, the interpenetrating bonding system of the present invention was employed in order to bond a typical HTPB-based propellant to a TPE insulation. Specifically the propellant was the DL-H453 propellant identified above. The insulation was identified as 3488, which is a Kevlar ® filled EPDM insulation.

In this example 4.0 grams/ft$^2$ of IPDI was applied to the insulator. After 7 days the propellant was added and bonded to the insulator. It was found that a good bond was achieved. Peel value in pli was measured at 17.5. AFT tensile strength was >150 psi. Representative penetrometer measurements at the interface were as follows:

| Interface | 7 |
|---|---|
| 0.3 mm | 13 |
| 0.5 | 13 |
| 1.0 | 18 |
| 1.5 | 23 |
| 2.0 | 23 |
| 5.0 | 24 |
| 10 | 24 |
| 15 | 24 |

This example illustrates the methods and compositions of the present invention and the fact that good bonding can be achieved between the insulation layer and the propellant without the need for a liner. It also illustrates the effectiveness of a relatively long time ($t_1$).

EXAMPLE 10

In this example, the interpenetrating bonding system of the present invention was employed in order to bond a typical HTPB-based propellant to a TPE insulation. Specifically the propellant was the DL-H453 propellant identified above. The insulation was identified as 3488, which is a Kevlar ® filled EPDM insulation.

In this example 2.0 grams/ft$^2$ of IPDI was applied to the insulator. After 70 days the propellant was added and bonded to the insulator. It was found that a good bond was achieved. Peel value in pli was measured at 9.7. AFT tensile strength was 161 psi.

This example illustrates the methods and compositions of the present invention and the fact that good bonding can be achieved between the insulation layer and the propellant without the need for a liner. It also illustrates the effectiveness of a long time ($t_1$).

SUMMARY

In summary, it will be appreciated that the present invention provides a more simplified and more reliable method for binding propellant within a rocket motor casing, such that a more reliable and economical rocket motor can be produced. Specifically, the present invention provides methods and compositions for placing propellant within a rocket motor casing without the need for a liner layer. By use of the present invention, the propellant is securely and reliably bound directly to the insulation layer. The present invention is very flexible to use and can be used with a variety of insulation materials and a variety of propellant materials, specifically HTPB-based propellant systems.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for binding propellants to an insulation layer, comprising the steps of:
   coating the surface of the insulation layer with a binding amount of a reactive material which is capable of reacting with both the insulation layer and with at least one propellant;
   applying a least one propellant over the coated insulation layer, which propellant is capable of reacting with the reactive material; and
   allowing the reactive material to react with the insulation layer and the at lest one propellant such that the propellant is bonded directly to the insulation layer and such that there remains no separate liner layer between the insulation layer and the propellant.

2. A method for binding propellants to an insulation layer as defined in claim 1 wherein the at least one propellant comprises a hydroxy-terminated polybutadiene-based propellant.

3. A method for binding propellants to an insulation layer as defined in claim 2 wherein the reactive material comprises isophorone diisocyanate.

4. A method for binding propellants to an insulation layer as defined in claim 3 wherein the reactive material further comprises at least one aziridine.

5. A method for binding propellants to an insulation layer as defined in claim 4 wherein the aziridine is di- or tri- functional.

6. A method for binding propellants to an insulation layer as defined in claim 5 wherein the aziridine is selected from the group consisting of 1,3 bis benzoyl 2 methyl aziridine and 1,3,5, tris benzoyl 2 ethyl aziridine.

7. A method for binding propellants to an insulation layer as defined in claim 4 wherein the aziridine comprises from about 1% to about 40% by volume of the reactive material.

8. A method for binding propellants to an insulation layer as defined in claim 1 further comprising the step of allowing the reactive material to diffuse into the insulation layer prior to application of the propellant.

9. A method for binding propellants to an insulation layer as defined in claim 1 further comprising the steps of choosing the reactive material such that it reacts with the propellant to form urethane bonds, and allowing the reactive material to react with the propellant such that the density of urethane bonds at the interface between the propellant and the insulator is increased and the propellant interface is reinforced.

10. A method for binding propellants to an insulation layer as defined in claim 1 further comprising the step of controlling the level of reactive material applied to the insulation layer.

11. A method for binding propellants to an insulation layer as defined in claim 10 wherein the reactive material is applied to a level of from about 0.25 gram/foot$^2$ to about 5.0 grams/foot$^2$.

12. A method for binding propellants to an insulation layer as defined in claim 1 further comprising the step of controlling the time between the application of the reactive material to the insulation layer and the application of the propellant.

13. A method for binding propellants to an insulation layer as defined in claim 1 further comprising the step of selecting the insulation layer such that it has a predetermined permeability to the reactive material.

14. A method for binding hydroxy-terminated polybutadiene (HTPB)-based propellant to an insulation layer within a rocket motor casing, comprising the steps of:
   coating the insulation layer with a reactive material which is capable of permeating at least a portion of the insulation layer, and which is further capable of reacting with both the insulation layer and at least one hydroxy-terminated polybutadiene-based propellant;
   applying at least one hydroxy-terminated polybutadiene-based propellant over the coated insulation layer; and
   allowing the reactive material to react with both the insulation layer and the propellant such that the insulation layer and the propellant are bonded together.

15. A method for binding HTPB-based propellants to an insulation layer within a rocket motor casing as defined in claim 14 further comprising the step of controlling the time between the coating of the insulation layer with reactive material and the application of the propellant over the coated insulation layer.

16. A method for binding HTPB-based propellants to an insulation layer within a rocket motor casing as defined in claim 15 wherein the time is from about 1 day to about 70 days.

17. A method for binding HTPB-based propellants to an insulation layer within a rocket motor casing as defined in claim 14 further comprising the step of controlling the level of reactive material coated onto the insulation layer.

18. A method for binding HTPB-based propellants to an insulation layer within a rocket motor casing as defined in claim 17 wherein the level of reactive material is in the range of from about 0.25 grams/foot$^2$ and about 5.0 grams/foot$^2$.

19. A method for binding HTPB-based propellants to an insulation layer within a rocket motor casing as defined in claim 14 wherein the reactive material comprises isophorone diisocyanate.

20. A method for binding HTPB-based propellants to an insulation layer within a rocket motor casing as defined in claim 19 wherein the reactive material further comprises from about 1% to about 40% of at least one di- or tri- functional aziridine.

21. A method for binding HTPB-based propellants to an insulation layer within a rocket motor casing as defined in claim 14 wherein the insulation layer comprises an ethylpropylene diene monomer elastomer.

22. A method for binding HTPB-based propellants to an insulation layer within a rocket motor casing as defined in claim 14 wherein the insulation layer comprises a thermoplastic elastomer.

* * * * *

UNITED STATES PATENT AND TRADEMARK OFFICE
CERTIFICATE OF CORRECTION

PATENT NO. : 5,273,785
DATED : December 28, 1993
INVENTOR(S) : Sinclair et al

It is certified that error appears in the above-indentified patent and that said Letters Patent is hereby corrected as shown below:

Column 1, line 39, "use,," should be --use,--.
Column 4, line 49, "Minn." should be --Minnesota--.
Column 8, line 19, "All measurements where" should be --All measurements were--.
Column 9, line 36, "above,," should be --above,--.
Column 9, Table II, seventh line down in Peel column "10.8" should be --10.9--.
Column 10, line 12, "(i.3." should be --i.e.--.
Column 10, Table III, fifth line in Peel column "0.8" should be --0.9--.
Column 11, Table IV, footnote "*insulation" should be --* = insulation--.
Column 13, line 30, "If will" should be --It will--.
Column 13, Table VIII, "6" under Pentrometer heading should be --5--.

UNITED STATES PATENT AND TRADEMARK OFFICE
CERTIFICATE OF CORRECTION

PATENT NO. : 5,273,785
DATED : December 28, 1993
INVENTOR(S) : Sinclair et al

It is certified that error appears in the above-indentified patent and that said Letters Patent is hereby corrected as shown below:

Column 18, insert fourth line in table to read --1.0 and 30--.
Column 19, line 33, "applying a" should read --applying at--.
Column 19, line 37, should read --lation layer and the at least one propellant...--.

Signed and Sealed this

Fifteenth Day of August, 1995

*Attest:*

BRUCE LEHMAN

*Attesting Officer*     *Commissioner of Patents and Trademarks*